US012644817B2

(12) United States Patent
Chu et al.

(10) Patent No.: US 12,644,817 B2
(45) Date of Patent: Jun. 2, 2026

(54) PARTICLE DISCRIMINATION BASED ON MULTI-ANGLE POLARIZED ELASTIC LIGHT SCATTERING

(71) Applicant: NANOZEN INDUSTRIES INC., Vancouver (CA)

(72) Inventors: Winnie Chu-Hui Chu, Vancouver (CA); Jingwen Li, Richmond (CA)

( * ) Notice: Subject to any disclaimer, the term of this patent is extended or adjusted under 35 U.S.C. 154(b) by 0 days.

(21) Appl. No.: 18/758,306

(22) Filed: Jun. 28, 2024

(65) Prior Publication Data

US 2026/0002861 A1    Jan. 1, 2026

(51) Int. Cl.
*G01N 15/1429* (2024.01)
*G01N 15/1434* (2024.01)
*G01N 15/14* (2006.01)

(52) U.S. Cl.
CPC ..... *G01N 15/1429* (2013.01); *G01N 15/1434* (2013.01); *G01N 2015/1488* (2013.01)

(58) Field of Classification Search
CPC ........... G01N 15/1429; G01N 15/1434; G01N 2015/1488
See application file for complete search history.

(56) References Cited

U.S. PATENT DOCUMENTS 9,594,011 B2 * 3/2017 Herzog .............. G01N 15/1456
2017/0315045 A1 * 11/2017 Silcott ................ G01N 15/1459

* cited by examiner

*Primary Examiner* — Tri T Ton

(57) ABSTRACT

Apparatus and method for real-time detection and classification of individual airborne particles using multi-angle polarized elastic scattering and employing intelligent data analysis techniques to achieve differentiation of particles.

7 Claims, 12 Drawing Sheets

Amplitude differences                    Phase differences

PARTICLE DISCRIMINATION BASED ON MULTI-ANGLE POLARIZED ELASTIC LIGHT SCATTERING

FIELD OF THE INVENTION

The present invention pertains to the field of particle analysis, specifically focusing on the differentiation, classification, and identification of airborne particles.

BACKGROUND OF THE INVENTION

The real-time characterization of airborne particles is a critical requirement across various industries, including pharmaceutical manufacturing, mining, and environmental monitoring. These industries require advanced methodologies for detecting and analyzing airborne particles to ensure product integrity, protect worker health, and comply with environmental regulations.

Existing technologies for particle detection, such as optical particle counters, have limitations in identifying particle composition. More sophisticated methods, including molecular-based spectroscopy (e.g., Liquid Chromatography-Mass Spectrometry [LCMS], X-Ray Diffraction [XRD], Fourier Transform Spectroscopy [FTIR]), offer higher accuracy in material characterization. However, these methods are typically hindered by their substantial size, complexity, and cost, making them impractical for many applications that require real-time analysis of single particle and portability.

Environment filtration sampling is often used in manufacturing and laboratory sites, which then requires sampling filter deposits to be analyzed in a laboratory. While this technique, combined with chemical characterization and analytical techniques, provides relatively accurate results it is both costly and more importantly, time consuming, where the results may take weeks to be reported. Moreover, the conventional air filtration sampling (+ post analytical characterization methods) provides integral measurements of aerosol particle characteristics and fall short when it comes to capturing the dynamic nuances of aerosol behavior during various processes. This limitation becomes particularly pronounced when attempting to monitor aerosol dynamics during complex processes, such as industrial manufacturing or environmental sampling. In such scenarios, the ability to pinpoint fluctuations in aerosol concentrations and compositions over time can offer invaluable insights into the underlying production processes. For instance, a sudden spike in target aerosol concentrations at a specific juncture could signal a malfunction or inefficiency within the system.

Another notable technique in the field is laser-induced fluorescence, which provides valuable composition information. Nevertheless, it lacks the capability for effective single-particle detection, a critical requirement for low particle concentration levels in many practical applications.

It is therefore obvious that there still remains a need for real-time, accurate detection and reporting of aerosol particles across the industry.

SUMMARY OF THE INVENTION

The present invention discloses an apparatus for real-time detection and classification of individual airborne particles of varying compositions and discloses methods of analysis based on multi-angle polarized elastic scattering signals.

The current invention samples the ambient aerosol environment through an interrogation volume to be measured and analyzed. The interrogation volume is illuminated by a light beam where particles, passing through the beam, reflect or scatter radiation with changed states of polarization with respect to the illumination beam. The scattered radiation is then detected by multiple polarization sensitive detectors and is converted to electric signals. Each detector is a photo diode and a thin polarized film pair creating a polarization sensitive detector. The embodiment disclosed herein uses four detectors positioned at different scattering collection angles. As the light beam is focused on a very a small area in the interrogation volume, a particle passing through the interrogation volume is only illuminated for a brief period and therefore, light signals detected and collected constitute a data set of a particular particle.

The data set is then used to determine angular dependent parameters of the particles, particularly, polarization ratio, signal magnitude (as related to size), optical, and morphological characteristics. Aerodynamic particle size may also be used in addition to the muti-angle polarized scattering to achieve improved classification accuracy.

The present invention is custom initialized for real-time classification and identification of known particles. The supervised learning process involves training a suitable Machine Learning Model (MLM) by sampling aerosol containing particles of known composition and constructing a profile or classifier model of the particles observed. The process of particle learning is thus adaptable for several manufacturing and laboratory monitoring procedures.

Once a profile of known particles of interest is developed then particles detected in an operational aerosol environment under test can be compared to the target profile or profiles for identification and are subsequently tabulated or otherwise presented indicating the presence of suspected identified particles. Particle signals detected which do not conform to target profile or profiles remain of interest as an indication of potential adulterants. As each collected data set is time-stamped, the particles can be displayed graphically indicating their occurrence over time, which is particularly useful in manufacturing and laboratory monitoring.

DETAILED DESCRIPTION OF THE INVENTION

Figure 1:
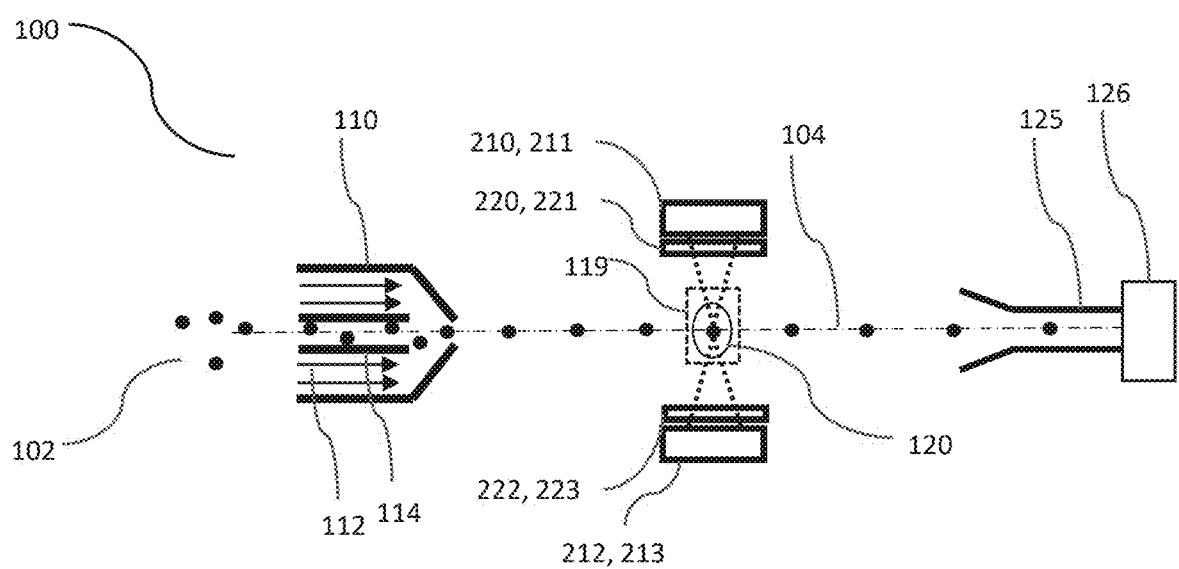
FIG. 1 is a schematic representation from the aerosol sampling system point of view of the current invention.

FIG. 1 illustrates the current invention 100 from the perspective of the aerosol flow. The target aerosol 102 is drawn through a converging nozzle 110 and as a particle stream 104 through an interrogation area 119 and subsequently collected via an outlet nozzle 125 and gathered on a collection filter or cassette 126 for post analysis. In the preferred embodiment of the current invention the light beam is emitted from a laser diode. It is important to note that the interrogation area 119 is nonreflective and that the light beam 120 is focused on a small area within the interrogation area 119 to prevent extraneous or secondary reflections. In the preferred embodiment the light beam 120 is 500 μm in height and 300 μm in width this is accomplished by the use of a single aspheric lens of the type disclosed in U.S. Pat. No. 10,823,659 to Jingwen Li. These dimensions may be altered depending on expected particle size.

To ensure testing accuracy and repeatability the particle flow must be tightly regulated. To this end the focusing nozzle 110 consists of a sampling tube 114 for the raw sampled aerosol which is surrounded by a filtered airflow sheath 112 which focuses the particles and prevents recirculation. As the particles exit the nozzle 110, they experience acceleration, leading to variations in velocity depending on their respective aerodynamic sizes.

The particle stream 104 subsequently intersects the light beam 120, and the radiation scattered by the interaction is captured by detectors 210, 211, 212, 213. In the current invention each detector consists of two components, a photo diode 210, 211 and 212, 213 and a respective linear film polarizer 220, 221 and 222, 223. It should be clear however, that future realizations may make use of integrated polarity sensitive detectors. We use the term detector herein to refer to a photo diode-film polarizer pair. The detectors in this view are shown edge wise and thus obscure each other, their placement will be made clearer below.

Figure 2:
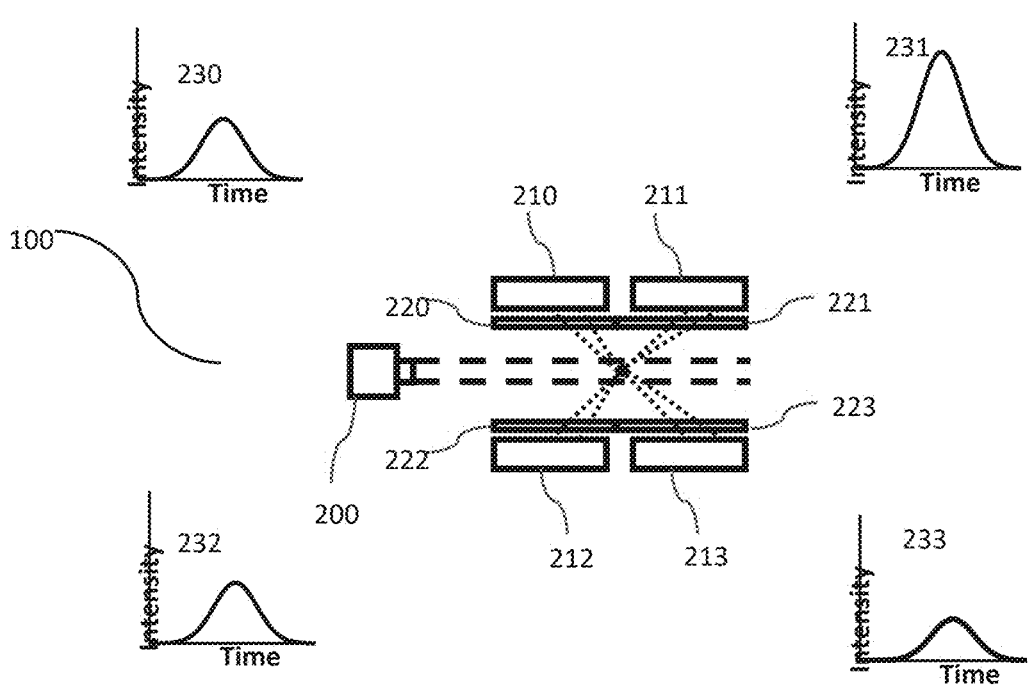
FIG. 2 is a schematic representation from the laser beam point of view of the current invention.

Turning now to FIG. 2, the current invention 100 is shown from the perspective of the light beam 120, the particle stream 104 is shown head on. In the preferred embodiment a laser diode 200 illuminates an area of the particle stream 104 which is depicted here head on in the form of a single particle.

As a particle traverses the light beam 104, it scatters light with varying degrees of polarization, depending on its composition, morphology, and internal asymmetric structures and molecular optical activity, that is captured by the detectors. In this embodiment, the detectors 210, 211, 212, are paired with a corresponding linear film polarizer 220, 221, 222, which have the same polarization as the laser beam 104 that is, they measure the scatter intensity for horizontally polarized light. Detector 213 is paired with film polarizer 223 with the orthogonal polarization and measures the scatter intensity for vertically polarized light.

Detectors 211 and 213 observe the forward propagation (e.g., angle collection range of 10-30 degrees) of the polarized scattered light, whereas detectors 210 and 212 receive the backward propagation (e.g., angle collection range of 140-160 degrees) of the scattered light. Analyzing the detected polarized elastic scattering, particularly the degree of linear or circular depolarization influenced by particle properties enables the classification of individual particles.

The intensity graphs 230, 231, 232, 233 illustrate the type of burst signal output by the detectors when a particle is illuminated by the laser beam 104 showing both time and intensity characteristics. The relationships of the intensity graphs and their corresponding detectors should be apparent in the figure. The detector outputs constitute a data set for a given particle observation and are time stamped for analysis.

Typically, the magnitude of forward scattering exceeds that of backward scattering. Detector 211 is covered with a film polarizer 221 which has the same polarization as the illumination beam, 104. The detected signal 231, exhibits the highest amplitude among the signals from all four detectors. Therefore, to enhance sensitivity for smaller particle sizes, this signal is used to determine the optical equivalent and aerodynamic sizes of the particle. For larger particle sizes where the forward signal saturates, the backward signal may be used for extending the particle sizing range.

The combination of forward and backward polarized scattering measurements in the current invention provides the detection and classification of particles in a dynamic range of aerodynamic sizes from 0.3 to 100 μm.

Figure 3:
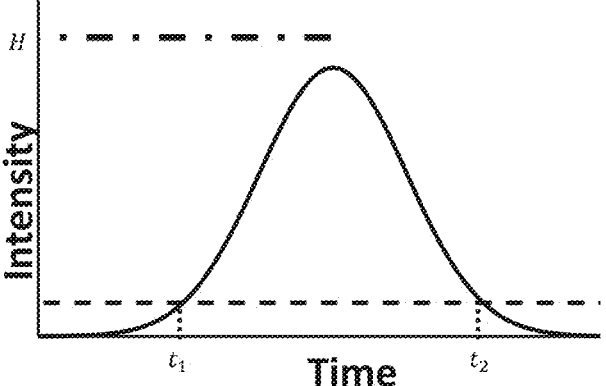
FIG. 3 is a typical signal of a selected observed particle used to determine the intensity of polarized elastically scattered light and the particle's aerodynamic diameter.

Turning now in reference to FIG. 3, a schematic graph of a sample burst signal is illustrated, which depicts a detected signal from detector 211 of FIG. 2. The height of this signal is correlated to the optical equivalent diameter of the particle, while its width, measured from a specific threshold (TH), is correlated with the particle's aerodynamic diameter.

Figure 4:
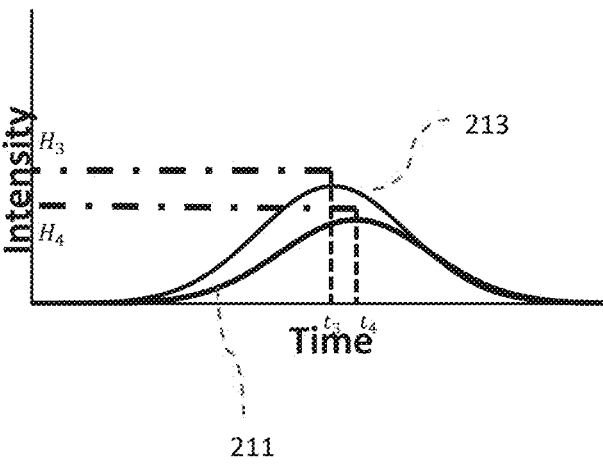
FIG. 4 is a schematic representation of time difference between two selected detector observations.

FIG. 4 is a schematic representation of the time difference between the signals from detectors 211 and 213 of FIG. 2, which are positioned at the same angle relative to the particle within the detection volume, allowing them to observe forward propagation of the scattered light. Despite the identical observed scattered polarized light, the orientation of the film polarizers covering these detectors differs and consequently, the amplitude of the detected signals from these detectors is solely influenced by the depolarization of the scattered radiation. The ratio of these signal amplitudes correlates with the disparity between the polarization of the scattered light and the illumination beam. Furthermore, the phase shift between the same and opposite polarizations induced by particles can be assessed by measuring the time difference in the signals from detectors 211 and 213 of FIG. 2. The same observation can be made of the time differences in signals from detectors 213 and 212 of FIG. 2

The normalized polarization of light in forward angular range is calculated as $$P_N^F = \frac{I_{0,211}}{I_{0,211} + I_{90,213}}$$

where $I_{90,213}$ denotes the intensity of the signal from vertically polarized scattered light detected by detector 213, and $I_{0,211}$ denotes the intensity of the signal from e.g. the horizontally scattered light detected by detector 211 covered with an orthogonal film polarizer to that of detector 213.

It should be clear that in the choices of light source polarization and polarizing filters in this embodiment of the current invention, other choices of light sources and polarizers, including wire-grid polarizers may be implemented and yet remain in the in the spirit of the current invention.

Alternatively, backward normalized polarization may be calculated as $$P_N^B = \frac{I_{0,210}}{I_{0,210} + I_{90,212}}$$

where, $I_{0,210}$ and $I_{0,210}$ denote the intensity of signals from vertically and horizontally scattered light, respectively.

Figure 5:
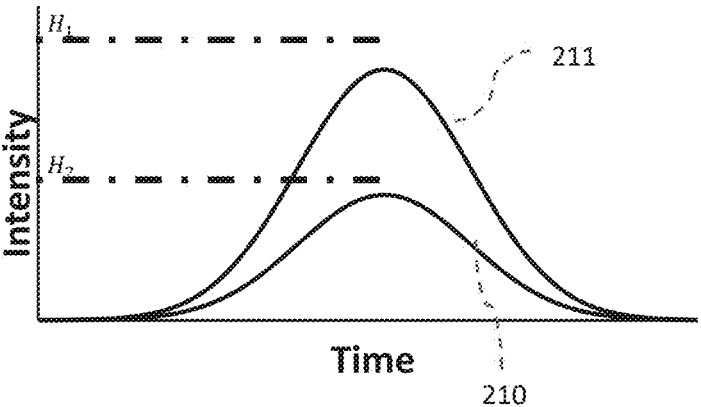
FIG. 5 is a schematic representation of amplitude difference in signals from forward and backward detection angles from detectors with similar film polarizers.

Turning now to FIG. 5, detectors 210 and 211 of FIG. 2 have film polarizers with the same orientation, thus, they both register the same polarization of the scattered light. However, detector 211 receives the forward propagation of the scattered light while detector 210 receives the backward propagation of the scattered light. As a result, the angular dependency of the polarized scattering is measured by taking the ratio of the amplitude of signals.

$$P_N^\theta = \frac{P_N^F}{P_N^B} = \frac{I_{0,211}}{I_{0,210}}$$

Figure 6:
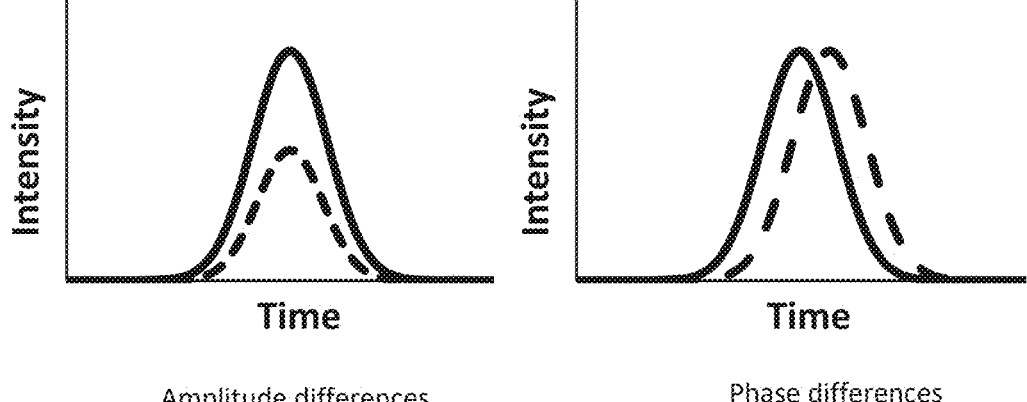
FIG. 6 are two schematic representations of signal representing false count examples, amplitude and phase differences observed beyond acceptable thresholds of variation.

Turning now to FIG. 6 schematic representation graphs are shown of false count examples. Since the relative angle of detectors 210 and 212 of FIG. 2 to the particle are the same and they both use the same film polarizers 220 and 222, they are expected to receive the same magnitude of scattered light and produce symmetrical signals. As a result, any difference between these two pulses can be an indication of a false counted particle (e.g., recirculated, or out of focus particles) and it is used to reject the received signals for that particle. A certain level of discrepancy is allowed to account for particle shape and orientation dependent scattering. Such effects are significantly smaller than errors resulted from false counted particles. The first graph shows a false count based on pulses with different amplitudes beyond set threshold, the second graph indicates pulses that are out of phase.

FIGS. 7, 8, 9, 10, 11 show graphs of particles detected by the apparatus of the current invention based on different combinations of their capture. We continue to discuss particle type classification for three scenarios.

In the primary scenario, we determine the fraction and size distribution for a single or multiple types of known particles within an aerosol sample. Supervised ML classification algorithms are preferred methods used to categorize particle types. The choice of the suitable model depends on the complexity and the extent of overlap in the particle parameters of the target particle types. The supervised learning process involves training a suitable model with the suitable particle parameters (obtained from sampling aerosolized particles of known type) as the input to the model and ascertaining particle type as the model output.

Suitability of the model and chosen inputs to it from the extracted particle parameters is evaluated by Classification accuracy (CA). For a pair of particle samples A and B, CA is defined as $$CA = \frac{TA + TB}{TA + TB + FA + FB}$$

where, TA, TB, FA, and FB denote correctly predicted particle A events, correctly predicted particle B events, incorrectly predicted particle A events, and incorrectly predicted particle B events, respectively.

To illustrate the process of choosing suitable model parameters, training a linear Logistics Regression model is exemplified in the following.

Figure 7:
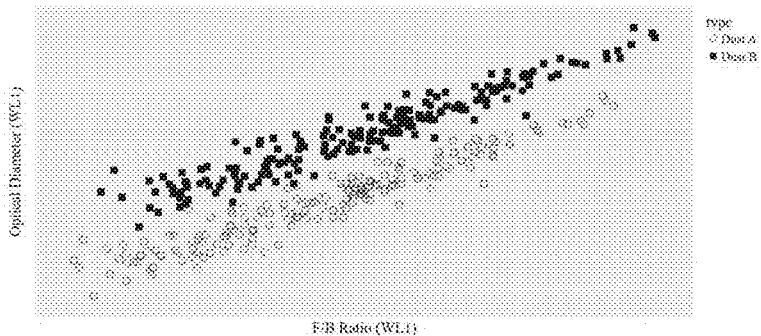
FIG. 7 is an example of particle classification using a combination of forward to backward scattered polarized light and optical equivalent diameter.

Consider a case where the angular scattering ratio and optical equivalent diameter (i.e., the intensity of a polarized scattered signal from a certain detector) are the parameters considered to classify two types of known particles in an aerosol sample. As depicted in FIG. 7, this approach efficiently separates two types of dust particles, Particle A and Particle B.

Figure 8:
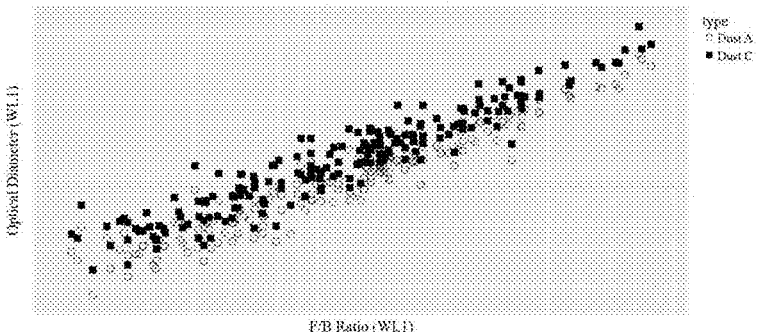
FIG. 8 is an example of limited accuracy particle classification using a combination of forward to backward scattered polarized light and optical equivalent diameter.

However, combination of angular scattering ratio and optical diameter encounters will provide limited classification accuracy when dealing with Particle A and Particle C, as illustrated in FIG. 8, where the measured parameters of the two particle types overlap significantly.

Figure 9:
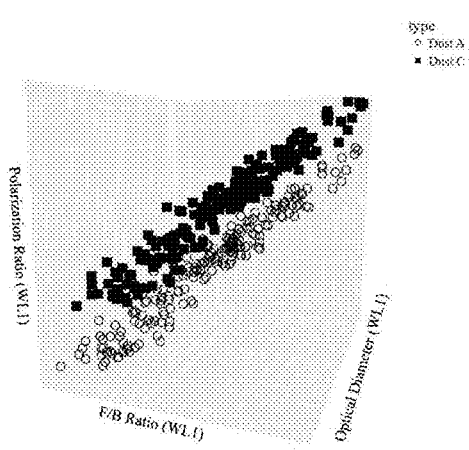
FIG. 9 is an example of particle classification using a combination of forward to backward scattered polarized light, polarization ratio, and optical equivalent diameter.

To address this limitation, an additional input parameter, the polarization ratio, is considered for model. FIG. 9 clearly demonstrates the effective separation of two previously overlapping particle groups.

Figure 10:
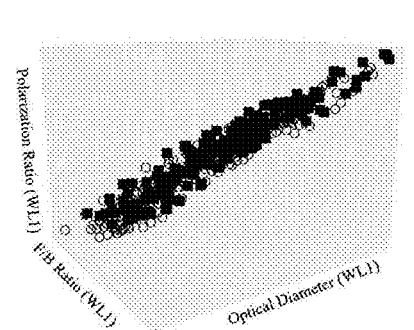
FIG. 10 is an example of limited accuracy particle classification using a combination of forward to backward scattered polarized light, polarization ratio, and optical equivalent diameter.
Figure 11:
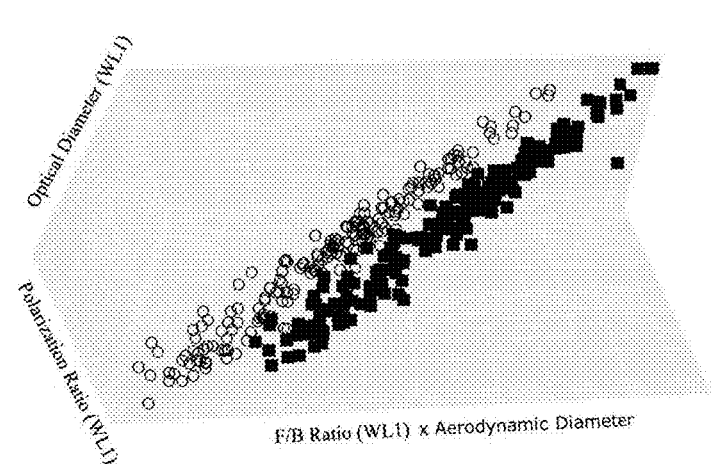
FIG. 11 is an example of particle classification using a combination of forward to backward scattered polarized light, polarization ratio, aerodynamic particle diameter, and optical equivalent diameter.

While this strategy successfully differentiates Particle A and Particle C, it will be limited in classification accuracy when differentiating another particle type, Particle D, as shown in FIG. 10. Particle A and Particle D exhibit considerable overlap when only using the three parameters presented in FIG. 11.

To enhance the classification accuracy, the introduction of another independent and informative input parameter is considered. By considering an additional input, aerodynamic particle size, an independent physical characteristic of the particle shape and size, Particle A and Particle D can be robustly differentiated, as demonstrated in FIG. 11.

Once a model and suitable input parameters are determined, a particle type profile is constructed for each known particle in terms of the adjusting parameters (e.g. coefficients, weight matrices) of the chosen model. The model algorithm can be implemented and processed on a microcontroller, field programmable gate array, digital signal processor, or a computer.

In the second scenario, we detect the type or identify potential components of an aerosol sample with unknown particle type composition. For each particle observation, a comparison can be made with a library of aerosol types from previous measurements of known material to determine potential constituents of an aerosol sample of unknown material. In this type of application, a model with fixed algorithm and input parameters applicable to the entire library of particle types is required. Thus, models such as neural networks with higher level of complexity are preferred.

In the third scenario, we classify unknown particles. In an environment with different types of unknown particles, clustering of aerosol observations with similar parameters (e.g. polarization ratio) may be conducted for detection of foreign particles. Suitable models for this application are unsupervised machine learning methods such as KNN and K-Means Clustering.

It is obvious from the foregoing that particles of a given type may be characterized by one or more classifier mathematical models. Machine Learning (ML) techniques Support Vector Machines (SVM), Linear Regression analysis, KNN Nearest Neighbor, and Neural Networks, to mention a few are preferred techniques. The choice of method is determined by the nature of the dispersion of the particle characteristics and the simplicity and efficiency of implementation.

We also point out that when monitoring for multiple particle types, the actual classifier models for the particle types may be different. Therefore, the implementation of the current invention for particle classification needs to be agile and capable of concurrently running different models for each particle type whether in processing code or in conjunction with a Field Programmable Gate Array.

Figure 12:
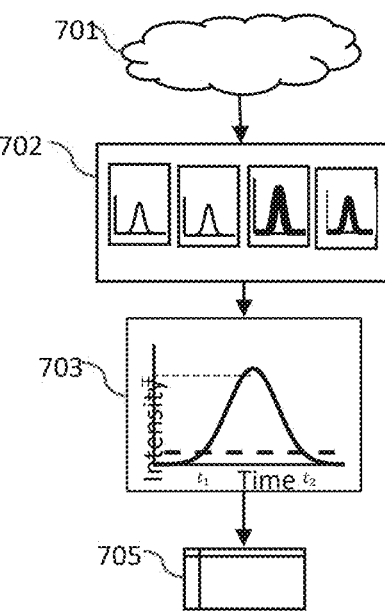
FIG. 12 illustrates an operational flowchart of signal acquisition from the interaction of particles in the apparatus of the current invention.

Turning now to FIG. 12, an operational flowchart of the preferred method of collecting particle characteristics using the current invention is shown. This operational flow is used both for training purposes, when the aerosol environment 701 contains particles of a known single type is presented and when the current invention is used for monitoring and the aerosol environment 701 contains undifferentiated particles. In both cases, when a particle is detected a series of signal bursts 702 from each detector used comprising a particle dataset are captured.

At 703 the captured particle dataset is first screened. The initial screening determines that at least one signal acquired has reached a pulse height threshold or is otherwise the data set is discarded. Next, the particle dataset is examined for false counted events as discussed above in reference to FIG. 6, as well as those with signals exceeded the range of detectors.

Screened particle event datasets are then analyzed to extract the particle event parameters including signal amplitudes and maxima time stamp for all detectors, event length (signal width), polarization ratio in different angles, scattering angular ratio, aerodynamic size, and optical size as previously discussed in reference to FIGS. 3, 4, and 5. The extracted particle characteristics are then stored in a file 703.

It should be understood from the foregoing that particles of a given type may be characterized by one or more classifier mathematical models. Machine Learning (ML) techniques, Support Vector Machines (SVM), Linear Regression analysis, KNN Nearest Neighbor, and Neural Networks, to mention a few are such techniques. The choice of method is determined by the nature of the dispersion of the particle characteristics and the simplicity and efficiency of implementation.

We also point out that when monitoring for multiple particle types, the actual classifier models for the particle types may be different. The choice of algorithm used is highly dependent on the efficiency of obtaining an accurate model of a particle as well as the computational efficiency required in a real-time environment. One such approach is discussed in the "Particle metrology and classification instrumentation based on dual-wavelength illumination and modulated polarization detection" IEEE Transactions on Instrumentation and Measurement, Jingwen Li, et. al. In an actual run-time implementation, it should be understood then that the signal acquisition process runs concurrently and independently of the analysis methodology for real-time operation; and that the analysis algorithm may itself require multiple processes which must be synchronized for accurate real-time event reporting.

From the foregoing, it will be appreciated that specific examples of apparatus and methods have been described herein for purposes of illustration, but that various modifications, alterations, additions, and permutations may be made without departing from the practice of the invention. The embodiments described herein are only examples. Those skilled in the art will appreciate that certain features of embodiments described herein may be practiced or implemented without all of the features ascribed to them herein. Such variations on described embodiments that would be apparent to the skilled addressee, including variations comprising mixing and matching of features from different embodiments are within the scope of this invention.

REFERENCES

Jingwen Li, U.S. Pat. No. 10,823,659, One Dimensional Beam Homogenization with a Single Aspheric Lens for Accurate Particle Sizing Instrumentation, Nov. 3, 2020.

Jingwen Li, Ruqiang Zhao, Jiefang Bi, Particle metrology and classification instrumentation based on dual-wavelength illumination and modulated polarization detection, IEEE Transactions on Instrumentation and Measurement.

What is claimed is:

1. A method for developing a polarization sensitive learned model for a particular particle, the method comprising the steps of:

injecting a suspended sample of a particular particle into an aerosol chamber;

using a monitoring apparatus to sample said chamber and provide a series of datasets signals based on each particle observed over a testing period and storing each dataset in a sample file for examination, wherein the monitoring apparatus is for real-time detection of a particle type in an aerosol, and the monitoring apparatus comprises:

an interrogation volume through which a stream of aerosol is drawn;

a focused light beam illuminating said interrogation volume;

a plurality of polarization sensitive detectors positioned with respect to said interrogation volume, wherein at least two of said detectors are configured to detect backscattered horizontally polarized light reflections from said particles;

a plurality of polarization sensitive detectors positioned with respect to said interrogation volume to detect forward scattered light, wherein at least one of said detectors is configured to detect horizontally polarized light and at least one of said detectors is configured to detect vertically polarized light; and a processing unit in communication with said detectors, wherein the processing unit collates the output of all said detectors when a particle interacts with said light beam into a dataset for said sample file;

verifying each dataset in the sample file for validity;

training a neural network model with each validated dataset sample; and optimizing the trained neural network model for real-time use and storing the model in a particle type database.

2. The method of claim 1 in which the optimized trained neural network model is converted to C/C++ code.

3. The method of claim 1 in which the optimized neural network model is converted to a field programmable gate array code.

4. The method of claim 1 including the validation of the optimized neural network model by examining the original validated dataset sample file.

5. The method of claim 1 in which the processing unit time stamps each dataset.

6. A method of monitoring an aerosol environment for a particular particle, the method comprising the steps of:

initializing testing with an optimized neural network model for a particle type from a particle type database;

using a monitoring apparatus to sample said aerosol environment and provide a series of datasets signals based on each particle observed over a testing period and storing each dataset in a sample file for examination, wherein the monitoring apparatus is for real-time detection of a particle type in an aerosol, and the monitoring apparatus comprises:

an interrogation volume through which a stream of aerosol is drawn;

a focused light beam illuminating said interrogation volume;

a plurality of polarization sensitive detectors positioned with respect to said interrogation volume, wherein at least two of said detectors are configured to detect backscattered horizontally polarized light reflections from said particles;

a plurality of polarization sensitive detectors positioned with respect to said interrogation volume to detect forward scattered light, wherein at least one of said detectors is configured to detect horizontally polarized light and at least one of said detectors is configured to detect vertically polarized light; and a processing unit in communication with said detectors, wherein the processing unit collates the output of all said detectors when a particle interacts with said light beam into a dataset for said sample file;

verifying each dataset in the sample file for validity; and examining each validated dataset sample with the optimized neural network model and storing the results and timestamp to a statistical database for display.

7. A method of monitoring an aerosol environment for multiple particle types, the method comprising the steps of:

initializing testing with an optimized neural network model for each particle type to be investigated from a particle type database;

using a monitoring apparatus to sample said aerosol environment and provide a series of datasets signals based on each particle observed over a testing period and storing each dataset in a sample file for examination, wherein the monitoring apparatus is for real-time detection of a particle type in an aerosol, and the monitoring apparatus comprises:

an interrogation volume through which a stream of aerosol is drawn;

a focused light beam illuminating said interrogation volume;

a plurality of polarization sensitive detectors positioned with respect to said interrogation volume, wherein at least two of said detectors are configured to detect backscattered horizontally polarized light reflections from said particles;

a plurality of polarization sensitive detectors positioned with respect to said interrogation volume to detect forward scattered light, wherein at least one of said detectors is configured to detect horizontally polarized light and at least one of said detectors is configured to detect vertically polarized light; and a processing unit in communication with said detectors, wherein the processing unit collates the output of all said detectors when a particle interacts with said light beam into a dataset for said sample file;

verifying each dataset in the sample file for validity; and wherein each optimized neural network model examines each validated dataset sample and provides the results and timestamp for each sample to a statistical database for display and further statistical operations.

* * * * *